US011053143B2

(12) United States Patent
Dulko

(10) Patent No.: US 11,053,143 B2
(45) Date of Patent: Jul. 6, 2021

(54) STABLE CONCENTRATED POLYALUMINUM CHLOROSILICATE SOLUTIONS

(71) Applicant: USALCO, LLC, Baltimore, MD (US)

(72) Inventor: James M. Dulko, Baltimore, MD (US)

(73) Assignee: USALCO, LLC, Baltimore, MD (US)

( * ) Notice: Subject to any disclaimer, the term of this patent is extended or adjusted under 35 U.S.C. 154(b) by 338 days.

(21) Appl. No.: 15/048,472

(22) Filed: Feb. 19, 2016

(65) Prior Publication Data

US 2016/0244345 A1  Aug. 25, 2016

Related U.S. Application Data

(60) Provisional application No. 62/118,971, filed on Feb. 20, 2015.

(51) Int. Cl.
| | | |
|---|---|---|
| *C02F 1/52* | (2006.01) | |
| *B01D 21/01* | (2006.01) | |
| *B01D 37/03* | (2006.01) | |
| *C01B 33/26* | (2006.01) | |
| *C02F 101/10* | (2006.01) | |

(52) U.S. Cl.
CPC ............ *C02F 1/5236* (2013.01); *B01D 21/01* (2013.01); *B01D 37/03* (2013.01); *C01B 33/26* (2013.01); *C02F 2101/105* (2013.01)

(58) Field of Classification Search
CPC .................................................. C02F 1/5236
See application file for complete search history.

(56) References Cited

U.S. PATENT DOCUMENTS

| | | | |
|---|---|---|---|
| 3,442,795 A | 5/1969 | Kerr et al. | 208/120 |
| 3,929,666 A | 12/1975 | Aiba et al. | 252/317 |
| 4,981,673 A | 1/1991 | Boutin et al. | 423/467 |
| 5,069,893 A | 12/1991 | Haase et al. | 423/556 |
| 5,076,940 A | 12/1991 | Boutin et al. | 210/716 |
| 5,246,686 A | 9/1993 | Cuer et al. | 423/467 |
| 5,348,721 A | 9/1994 | Murphy et al. | 423/463 |
| 5,603,912 A | 2/1997 | Giovanniello et al. | 423/467 |
| 5,985,234 A | 11/1999 | Dulko | 423/467 |
| 5,997,838 A | 12/1999 | Dulko | 423/462 |
| 6,036,935 A | 3/2000 | Dulko | 423/462 |
| 6,548,037 B1 | 4/2003 | Pozzoli | 423/512.1 |
| 2013/0168325 A1 | 7/2013 | Song et al. | |
| 2015/0021514 A1 | 1/2015 | Dulko | 252/175 |
| 2016/0074873 A1 | 3/2016 | Wonder | |

FOREIGN PATENT DOCUMENTS

| | | | | |
|---|---|---|---|---|
| CA | 2532286 A1 | 7/2007 | ................ | C02F 1/52 |
| CA | 2555875 A1 | 7/2007 | | |
| CN | 102092827 B | 7/2013 | ................ | C02F 1/52 |
| GB | 2038301 A | 7/1980 | ............. | C01B 33/28 |

OTHER PUBLICATIONS

International Searching Authority, International Search Report—International Application No. PCT/US2016/018709, dated Aug. 10, 2016, together with the Written Opinion of the International Searching Authority, 21 pages.
Gao, B.Y., et al., "Poly-aluminum-silicate-chloride (PASiC)—a new type of composite inorganic polymer coagulant," Colloids and Surfaces A: Physicochem. Eng. Aspects, vol. 229, pp. 121-127, Nov. 24, 2003.
Gao et al., "Evaluation of Aluminum-Silicate Polymer Composite as a Coagulant for Water Treatment," Water Research, vol. 36, pp. 3573-3581, Feb. 1, 2002.
Thompson et al., "Cristobalite-Related Phases in the $NaAlO_2$—$NaAlSiO_4$ System. I. Two Tetragonal and Two Orthorhombic Structures," Acta Crystallographica, Section B, Structural Science, vol. 54, No. 5, pp. 531-546, Oct. 1, 1998.
Tzoupanos et al., "The Application of Novel Coagulant Reagent (Polyaluminium Silicate Chloride) for the Post-Treatment of Landfill Leachates," Chemosphere, vol. 73, Issue 5, pp. 729-736, Aug. 3, 2008.
Zouboulis et al., "Polyaluminium Silicate Chloride—A Systematic Study for the Preparation and Application of an Efficient Coagulant for Water or Wastewater Treatment," Journal of Hazardous Materials, vol. 162, pp. 1379-1389, Jun. 13, 2008.
International Searching Authority, Invitation to Pay Additional Fees and, Where Applicable, Protest Fee—International Application No. PCT/US2016/018709 dated Apr. 28, 2016, 8 pages.
Radnai et al. "Structure of Aqueous Sodium Aluminate Solutions: A Solution X-ray Diffraction Study", J. Phys. Chem. A, vol. 102, pp. 7841-7850, Jul. 1998.

*Primary Examiner* — Peter Keyworth
(74) *Attorney, Agent, or Firm* — Sunstein LLP

(57) ABSTRACT

Novel polyaluminum chlorosilicates (PACSi) and sodium aluminum silicate (SAS) products having improved characteristics useful in the treatment of water and wastewater as compared with polyaluminum chlorides (PAC), are provided herein, as well as new processes for their manufacture, and methods of using PACSi as coagulants and flocculants in the treatment of water and/or wastewater.

13 Claims, No Drawings

STABLE CONCENTRATED POLYALUMINUM CHLOROSILICATE SOLUTIONS

CROSS-REFERENCE TO RELATED APPLICATIONS

The present application claims the benefit of U.S. Provisional Application 62/118,971 filed Feb. 20, 2015, which is hereby incorporated by reference in its entirety.

TECHNICAL FIELD

The present invention is directed to novel polyaluminum chlorosilicates (PACSi), processes for their manufacture, and methods of using PACSi as coagulants or flocculants in the treatment of water and/or wastewater, for example, to remove impurities and/or turbidity.

BACKGROUND ART

Polyaluminum chlorides (PACls), polyaluminum chlorosulfates (PACSs), Polyaluminum silicate sulfates (PASS), and polyaluminum chlorosilicates (PACSi) are used in water treatment. In water and wastewater treatment processes, these polyaluminum compositions serve as flocculants and coagulants. Processes for producing polyaluminum compounds having characteristics favorable for water treatment have been described in a number of previous publications, including: U.S. Pat. No. 5,246,686; U.S. Pat. No. 4,981,673; U.S. Pat. No. 5,076,940; U.S. Pat. No. 3,929,666; US 5,348,721; U.S. Pat. No. 6,548,037; U.S. Pat. No. 5,603,912; U.S. Pat. No. 5,985,234; U.S. Pat. No. 5,069,893 A; CN 102092827B and CA 2532286 A1.

Low basicity PACls (0-45% basicity) are very stable in solution but can also be very corrosive. They tend to form small flocs, depress pH, and require use in high concentrations of the PACl composition relative to other products used in water treatment.

High basicity PACls (45-75% basicity) are somewhat better as coagulants in water treatment, but ordinarily cost more to manufacture and have a limited shelf life (for example, 1 to 3 months). Highly basic aluminum chlorohydrate (83%-87% basicity) solves most issues of its lower basicity counterparts, but is not as effective as a coagulant in cold water or highly turbid water, and produces small flocs that are difficult to settle, resulting in less ability to remove impurities. These highly basic products are best in removing organic impurities from water, efficiently removing higher levels of non-purgeable organic carbon (NPOC) than the less basic products. 80 to 84% basic PACls have a freezing point of 17-25° F., requiring outside storage tanks to be insulated and heat traced in most of the US.

PASS products have proven useful in niche applications, and are particularly useful in applications where chloride cannot be tolerated. PASS compositions work well in some treatment facilities but do not perform as well as PACs or PACSs in most applications. As disclosed in U.S. Pat. No. 5,069,893, PASS is particularly suitable for dewatering plant material containing water and plant juices, e.g. sugar beet pulp which has had the sugar leached out with water. Conventionally, the remaining pulp is dewatered by pressing, dried and used for animal feed. In the past, aluminum sulphate has been sprayed onto the leached beet pulp prior to pressing to obtain a product containing lower amounts of water prior to the drying step. PASS products when used in this way, can lead to an even drier pressed pulp and thus make the drying step shorter and/or more economical.

PACSs are highly efficient coagulants and work well in both cold and highly turbid waters. The main problems associated with use of these compounds include limited shelf life, and rapid degradation, and inefficient removal of NPOC as compared with Aluminum chlorohydrate. Sulfated PACS absorb energy when exposed to elevated temperatures, e.g., greater than 95° F. They degrade rapidly, for example, within two weeks at 95° F., and are completely destroyed at 110° F. If exposed to heat during any step in the process, even during synthesis, the efficacy of the product is compromised. PACSi products are highly effective coagulants, however, techniques for producing PACSi are time consuming, taking up to 3 days for the Al—Si polymers to form; are energy demanding, requiring long incubation periods; and are not able to make concentrated solutions. Prior art PACSi products are formulated with large amounts of dilute $SiO_2$ solutions, in order to prevent formation of insoluble silicon compounds. Dilute solutions of prior art PACSi described in the literature list $Al_2O_3$ concentrations of 0.5%-8%, which are not competitive with available poly aluminum products.

SUMMARY OF EMBODIMENTS

Embodiments of the present invention provide new polyaluminum chlorosilicate (PACSi) compositions and methods for producing PACSi compositions that are stable, for example, at least 6 months to 1 year, are resistant to heat degradation, for example, up to 130° F., do not freeze above 0° F., and are able to quickly and efficiently remove turbidity from highly turbid solutions. Embodiments of the improved PACSi of the invention also remove a significantly greater amount of non-purgeable organic carbon (NPOC) and turbidity from water as compared to polyaluminum chlorosulfate, and are as good, if not better, in removing non-purgeable organic carbon (NPOC) and turbidity from water when compared to aluminum chlorohydrate. Aluminum chlorohydrate, when used in water treatment, forms much smaller flocs in comparison to those formed by PACSi, resulting in lower settling times in comparison to the PACSi product. This could be a significant problem in highly turbid waters.

The new PACSi embodiments can be formulated quickly, for example in a few hours, by combining either sodium aluminum silicate (SAS) or dilute sodium silicate solution with aluminum chloride (ACL) or basic aluminum chloride (BAC) solution, as demonstrated in the Examples below.

The PACSi products and processes for producing them as described herein are improved over prior known polyaluminum chlorosilicates PACSi. Addition of concentrated sodium silicate to aluminum salts does not produce a useful product, but instead results in the formation of a useless gel. In contrast, the processes and products of the currently disclosed invention result in the formation of useful, stable PACSi products without gel formation.

In a first embodiment, the invention as described herein provides a novel sodium aluminum silicate compound, produced by adding an amount of 50% sodium hydroxide and an amount of sodium silicate having 28.7% SiO2 to and amount of water, heating the mixture to boiling before adding an amount of aluminum oxide trihydrate, maintaining at a boil for one hour, and cooling to room temperature to obtain a sodium aluminum silicate (SAS) solution, as described below for Example 1. The SAS compound comprises Formula II:

where

In a second embodiment, the invention as described herein provides compositions comprising a polyaluminum chlorosilicate compound (PACSi) having a $SiO_2$ content of 0.1% to 1.0% $SiO_2$, and a basicity of 74% to 84%. These compositions are further characterized by having a concentration of 10%-22% $Al_2O_3$. According to one embodiment, the PACSi compositions of the invention have the formula:

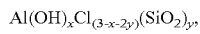    (Formula I), in which:
x is 1.5 to 2.5;
y is 0.01 to 0.1;
the ratio of OH:Al is 2.2 to 2.55;
have a basicity of 74% to 84%
and wherein the concentration of $Al_2O_3$ is 10% to 22%.

In another embodiment, the invention is directed to a process for producing the compositions described above and comprising the steps of: mixing of a solution of 70-90% basic aluminum chloride (BAC) or aluminum chloride (ACL) with a solution of 10-30% sodium aluminum silicate (SAS). The process can be carried out at any temperature that is practical, and is not temperature dependent. In making these products, external heating or cooling is not required. The solutions are mixed together for example, using an agitator such as a mechanical stirrer to produce even mixing. Once mixed, the solution will require slow agitation to keep undissolved solids from settling. It will take about 1 to 12 hours for the solids to dissolve, depending on the amount of shear, the temperature, and the concentration of the product. Any residual colloidal materials can be filtered out to produce a clear solution.

The sodium aluminum silicate solution (SAS) used in making the PACSi described above is alternatively produced by a method that includes the steps of: a) first mixing 35-60% of a 50% sodium hydroxide with 1.7-6% of an approximately 30% $SiO_2$ sodium silicate solution and about 5 to 15% water, heating till clear; and b) adding 35-50% aluminum oxide trihydrate to the mixture of a). The resulting solution is heated till the aluminum oxide trihydrate is dissolved. Any commercially available sodium silicate and sodium hydroxide can be used to make the sodium aluminum silicate solutions. This process produces a sodium aluminum silicate (SAS) of the following composition:
% $Al_2O_3$: 20-32%
% $Na_2O$: 12-22%
% $SiO_2$: 0.5%-1.7%
Molar Ratio: $Na_2O$: $Al_2O_3$: 1.0-1.30
Molar Ratio: Si:Al: 0.015-0.08

The sodium aluminate silicates (SAS) of this invention are unique as these solutions are stable at molar ratios of $Na_2O$:$Al_2O_3$ that are outside the range of sodium aluminate solutions known to be stable (See Figure X). They also differ from solutions utilized for making zeolites which have high Si:Al ratios (2-100), whereas the SAS products of this invention have very low Si:Al ratios in comparison (0.015-0.08).

In yet another embodiment, sodium silicate solution can be added to BAC or ACL to make silicated BAC or ACL. This process includes the steps of a) mixing sodium silicate solution with water so that the $SiO_2$ concentration is 0.3-3% $SiO_2$ and b) mixing the 1-10% of the sodium silicate solution with 90-99% of BAC or ACL, to yield a silicate BAC or ACL.

The silicated BAC or ACL solution is mixed with either sodium aluminum silicate or sodium aluminate to form PACSi by any of the following methods:
a) mixing of a solution of 70-90% of silicated BAC with 10-30% SAS,
b) mixing of a solution of 70-90% of silicated ACL with 10-30% sodium aluminate (SA);
c) mixing of a solution of 70-90% of silicated BAC with 10-30% SAS, or
d) mixing of a solution of 70-90% of silicated ACL with 10-30% sodium aluminate (SA).

The PACSi solutions can be blended with aluminum chlorohydrate solutions, for example, 10-50% aluminum chlorohydrate, to form a more stable, concentrated and efficient product. The addition of aluminum chlorohydrate reduces the salt content and increases stability of the product, and also increases its basicity, leading to better TOC removal and lower residual aluminum in treated water.

In another embodiment, the invention encompasses a method of treating water to remove impurities by adding the PACSi solution described above to the water to be treated, in a sufficient amount to coagulate and flocculate impurities, and subsequently separating the water from the coagulated or flocculated material. The amount of PACSi required is determined using procedures well known in the art and separation is achieved by standard procedures such as allowing coagulated or flocculated materials to sediment and/or employing filtration methods.

In general, the water treatment process includes adding an amount of PACSi to the water to be treated. Typical doses include 5-100 mg/L, and can be routinely determined by jar testing the water to be treated.

DETAILED DESCRIPTION OF SPECIFIC EMBODIMENTS

Definitions

As used in this description and the accompanying claims, the following terms shall have the meanings indicated, unless the context otherwise requires:

Aluminum chlorohydrate (ACH) is a 50% solution of aluminum chlorohydrate dihydrate having the chemical formula of $Al_2(OH)_5Cl \cdot 2H_2$, a concentration of 23-24% aluminum oxide, and a basicity of 80-84%.

Aluminum chloride (ACL) solutions are products of the reaction of aluminum oxide trihydrate and hydrochloric acid. Commercially available solutions of ALC contain 28% aluminum chloride and 0 to 0.5% free hydrochloric acid. Aluminum chloride has the chemical formula of $AlCl_3$, and is commercially available, for example, from United States Aluminum Company (USALCO), Baltimore, Md.

Basic aluminum chlorides (BAC) are products of the reaction of aluminum oxide trihydrate and hydrochloric acid. The amount of hydrochloric acid is shorted so that there is insufficient chloride to make the neutral salt of aluminum chloride. They can also be made digesting aluminum metal in hydrochloric acid, or aluminum chloride.

Basic aluminum chloride of various basicities can be made by blending products of the above two processes. Basic aluminum chloride solutions can be formulated from 8 to 25% Al2O3. Basic aluminum chlorides are of the Formula I: $Al_2(OH)_{(6-x)}Cl_x$ where x=1 to 6, preferably 2 to 6, and are commercially available, for example, from USALCO, Baltimore, Md.

Percent Basicity: Percent basicity is defined as (% OH) (52.91)/(% Al). On a molar level, this may be expressed as ((OH)/(Al))/3 multiplied by 100. Thus, $Al_2(OH)_2Cl_4$ has a basicity of 33%.

Sodium Silicate solution: These are highly alkaline solutions made by dissolving $SiO_2$ in sodium hydroxide solutions. They can have a weight ratio of 3.22 to 1.80 $SiO_2$/$Na_2O$ and concentrations of 23 to 34% $SiO_2$. For the purpose of this invention a weight ratio of 3.22 is ideal (although not required) as it minimizes the amount of sodium hydroxide in the product.

Polyaluminum chlorosilicates: The polyaluminum chlorosilicates of embodiments of the invention have the formula of Formula III: $Al(OH)_xCl_{(3-x-2y)}(SiO_2)_y$, (formula I), in which: x is 1.5 to 2.5; y is 0.003 to 0.1; the ratio of OH:Al is 2.2 to 2.55; wherein the polyaluminum chlorosilicate solution has a basicity of 74% to 84% and a concentration of $Al_2O_3$ of 10% to 22%.

Sodium aluminate solution: Sodium aluminate solutions are highly alkaline solutions made by reacting aluminum oxide trihydrate with sodium hydroxide solutions, and have a chemical formula of $Na_2Al_2O_4$. Sodium aluminate solutions are commercially available, for example, from USALCO, Baltimore, Md., at 38%, 43% and 45%, and in different $Na_2O/Al_2O_3$ mole ratios. It is preferable to use a lower mole ratio such as 1.27 to minimize the amount of sodium chloride in the product of this invention. Solutions would have the chemical formula of Formula II: $(Na_2O)_a(Al_2O_3)(SiO_2)_c$ in which: a is 1 to 1.3 and y is 0.03 to 0.15.

Sodium aluminum silicate solutions are prepared by dissolving aluminum oxide trihydrate in a sodium hydroxide solution containing sodium silicate. They can have a molar ratio of $SiO_2$ to $Na_2Al_2O_4$ of 0.03 to 0.15, a molar ratio of $Na_2O$ to $Al_2O_3$ of 1.0-1.25 and a concentration of 30 to 55% $Na_2Al_2O_4$. These compounds have the chemical formula of Formula II: $(Na_2O)_a(Al_2O_3)(SiO_2)_c$ in which a is 1 to 1.3 and c is 0.03 to 0.15

Polyaluminum Chlorosilicates

Embodiments of the present invention are directed to concentrated, high basicity polyaluminum chlorosilicate (PACSi) compositions that are temperature stable from 0 to 150° F. for periods up to six months to a about one year. These compositions are highly effective in removing impurities from water and wastewater. They have the ability to remove non-purgeable organic carbon (NPOC) and turbidity from waters with surprising efficiency. The compositions of embodiments of the invention include PACSi having the chemical formula: $Al(OH)_xCl_{(3-x-2y)}(SiO_2)_y$, (Formula I), in which x is 1.5 to 2.5, y is 0.01 to 0.1, and the ratio of OH:Al is 2.2 to 2.55, wherein the composition has a basicity of 74 to 84%, and a concentration of $Al_2O_3$ of 10 to 22%. A specific PACSi formula of embodiments of the invention is that of Formula IV: $Al(OH)_{2.18}Cl_{0.78}(SiO_2)_{0.02}$.

Processes of Making PACSi

The various embodiments of the invention disclosed herein include a process for producing polyaluminum chlorosilicates by mixing sodium aluminum silicate with a 28% aqueous aluminum chloride solution. The aluminum chloride can be purchased commercially or manufactured by digesting aluminum oxide trihydrate in a hydrochloric acid solution. The sodium aluminum silicate is produced by digesting aluminum oxide trihydrate in a mixture of sodium hydroxide and sodium silicate. The aqueous solution contains 0.9 to 4% $SiO_2$ and 30 to 45% sodium hydroxide. Aluminum oxide trihydrate is added such that the final aluminum oxide concentration is about 20 to 27% $Al_2O_3$.

The polyaluminum chlorosilicate can be made either continuously or in batch mode by mixing 10 to 30% sodium aluminum silicate with 70 to 90% aluminum chloride solution. It is important to not exceed 84% basicity during the mixing process to prevent solidification of the product. Since there is no sulfate in the product, there is no need to reduce the temperature to prevent temperature degradation of the product. It may be convenient to mix the solutions under ambient conditions to enhance mixing. Mixing is done using an mechanical agitator such as a magnetic stirrer. After all the ingredients are mixed together the solution is generally agitated to keep the solids suspended until completely dissolved. This process may take one to twelve hours, depending on mixing conditions and temperature. Any colloidal materials remaining can be filtered out to produce a clear solution.

In an alternative process, the polyaluminum chlorosilicate is made with basic aluminum chloride instead of aluminum chloride solution. Basic aluminum chlorides can be formulated at higher concentrations of aluminum oxide than aluminum chloride, and use of the higher concentration enables the polyaluminum chlorosilicates to be formulated at higher concentrations. The higher basicity of the basic aluminum chloride minimizes the amount of sodium silicate that is added. The process is generally the same as making polyaluminum chlorosilicates from aluminum chloride solution. A solution of 10 to 30% sodium aluminum silicate is mixed with 70 to 90% basic aluminum chloride solution. Mixing should be done with enough shear to produce a uniform suspension. After all the ingredients are mixed together the solution should be agitated to keep the solids suspended until completely dissolved. This process will take one to twelve hours depending on mixing conditions, and temperature. Any colloidal materials can be filtered out to produce a clear solution.

Another alternative to the process of making polyaluminum chlorosilicates is the incorporation of sodium silicate into the basic aluminum chloride or aluminum chloride solution. The sodium silicate is diluted to provide an aqueous solution containing 0.2% to 7% $SiO_2$, followed by addition of 1 to 10% of the sodium silicate solution to an aluminum chloride (ALC) or basic aluminum chloride (BAC) solution. Mixing is not temperature dependent, and can occur at ambient temperatures or whatever temperature is convenient. The mixing is applied until a clear solution is reached. Silicated-aluminum chloride and/or silicated-basic aluminum chloride can be obtained from commercial sources or can be manufactured from commercially available sodium aluminate without requiring the production of sodium aluminum silicate. To produce the polyaluminum silicate, 10 to 30 wt % sodium aluminate solution is mixed with 70 to 90 wt % silicated-aluminum chloride or silicated-basic aluminum chloride. As described above, mixing is done with enough shear to produce a uniform suspension. After all the ingredients are mixed together the solution is agitated generally for one to twelve hours, to keep the solids suspended until completely dissolved. The amount of time needed can vary according to mixing conditions, and temperature. Any colloidal materials can be filtered out to produce a clear solution.

According to another embodiment, 10 to 30% sodium aluminum silicate is mixed with 70% to 90% silicated-basic aluminum chloride or silicated-aluminum chloride. The process for producing the polyaluminum chlorosilicates is the same as described above.

In yet another embodiment, the polyaluminum chlorosilicates are blended with aluminum chlorohydrate solutions. This blending results in a lower salt concentration, which adds stability and shelf life of the product, and also increased basicity and concentration of the products that is not attainable by processes that use sodium aluminum silicate or sodium aluminate.

The procedures described above produce PACSi having a concentration of at least 10% $Al_2O_3$, preferably 10-22%, and a basicity greater than 74% (preferably 74-84%). The PACSi is used to treat water, for example, by adding PASCi to raw water or wastewater to coagulate and remove impurities. Typically, the PACSi is mixed into raw water at dosage of 5 to 100 mg/L. The water is generally rapidly mixed with the PACSi and then is slowly mixed for several minutes. Mixing is then stopped and the impurities that have been attracted to the PACS and are allowed to settle to the bottom of the water. The supernatant can then be filtered and proceeds through the rest of the treatment process. PACSi can be used in wastewater treatment to remove phosphorous and/or impurities.

Most typically, the PACSi solution will be added to raw water or wastewater to coagulate and remove impurities. The water is generally rapidly mixed with the PACSi and then is slowly mixed for several minutes. Mixing is then stopped and the impurities that have been attracted to the PACSi and are allowed to settle to the bottom of the water. The supernatant is then filtered and proceeds through the rest of the treatment process. PACSi can be used in wastewater treatment to remove phosphorous and/or impurities. When used for this, 50 to 300 mg of PACSi is typically used per liter of wastewater.

Advantages of PACSi

Sulfated PACS are widely used as flocculants in water treatment. They react quickly in water, form large flocs and settle rapidly. They are highly efficient in treating highly turbid water conditions but fail to remove NPOC as efficiently as aluminum chlorohydrate. The drawback is that the sulfated PACSs have a limited shelf life and degrade quickly at temperatures above 84° F. This makes PACS products unsuitable for areas where the temperature will degrade the product or where there is a need for greater NPOC removal. Aluminum chlorohydrate works effectively in removing NPOC, but does not work effectively in removing turbidity from high turbidity waters, or when the temperature of the water falls below 40° F. The aluminum chlorohydrate solutions freeze at temperatures above 0° F.

High basicity PACSi of the present invention are highly effective as flocculants in water treatment. The PACSi products described herein produce fast large flocs in water at all temperatures, do not decompose at elevated temperatures, and have a shelf life of about 6 months to a year. The PACSi products remove more NPOC than the sulfated PACSs and equal or exceed the removal of NPOC by aluminum chlorohydrate.

The PACSi products described herein are unique and provide advantages for water treatment efficiency over sulfate polyaluminum chlorides. As described above, the PACSi products maintain their stability for more than 6 months. As shown in Example 7, a PACSi product disclosed herein maintained its turbidity at than 50 ntu during that 6 month period, and even after 10 months, and as well after 10 weeks exposure to a temperature of 110° F. (See Table 2). The American Water Works Association publishes a standard for Liquid Polyaluminum Chloride. The current standard is ANSI/AWWA B408-10. The Standard requires that solutions of polyaluminum chloride have a turbidity of less than 50 ntu.

The following non-limiting Examples are provided to demonstrate methods of production and use of the PACSi molecules disclosed herein.

EXAMPLES

Example 1

Production of Sodium Aluminum Silicate (SAS)

Sodium aluminum silicate: In a 600 milliliter glass beaker 317 grams of 50% sodium hydroxide was added along with 34 grams of sodium silicate solution having 28.7% $SiO_2$ and a weight ratio of 3.22 $SiO_2/Na_2O$ and 78 grams of water. The solution was heated to boiling, at which time 273 grams of aluminum oxide trihydrate was added. The solution was maintained at boiling for a period of one hour. The solution was then cooled to room temperature. This process produced a 1.4% sodium aluminum silicate solution (SAS) having 25.5% $Al_2O_3$, 18.4% $Na_2O$, a $Na_2O$ to $Al_2O_3$ mole ratio of 1.22, and a Si:Al molar ratio of 0.05 and solution.

Example 2

Production of Polyaluminum Chlorosilicate (PACSi)

Polyaluminum chlorosilicate: In a 600 milliliter glass beaker was placed 291 grams of basic aluminum chloride solution having 10.75% $Al_2O_3$ and a basicity of 0.22%. Into this solution was mixed 128 grams of the sodium aluminum silicate solution of Example 1 and 31 grams of water. The solutions were mixed until homogeneous, generating a white suspension, and reaching a temperature of 126° F. After 12 hours the solution was filtered, yielding a polyaluminum chlorosilicate of 13.7% $Al_2O_3$, 81.2% Basic and 0.4% $SiO_2$.

Example 3

Production of Polyaluminum Chlorosilicate (PACSi)

Polyaluminum chlorosilicate: Into a 150 milliliter beaker was placed 4.5 grams of sodium silicate solution containing 28.7% $SiO_2$ and 8.9% $Na_2O$. This solution was mixed with 24.5 g of water to form a clear 4.5% $SiO_2$ solution. Into a 600 milliliter glass beaker was placed 295 grams of basic aluminum chloride containing 10.75% $Al_2O_3$ and having a basicity of 0.22%. An amount of 28.9 grams of the dilute sodium silicate solution (4.5% $SiO_2$) was added, and the resulting solution was mixed with 126 grams of the sodium aluminum silicate (SAS) solution of example 1. The solution was mixed until homogeneous, generating a white suspension, and reaching a temperature of 126° F. After 12 hours the solution was filtered and yielded a polyaluminum chlorosilicate (PACSi) of 14.0% $Al_2O_3$, 82.6% Basic and 0.7% $SiO_2$.

Example 4

Production of Polyaluminum Chlorosilicate (PACSi) with SAS

Polyaluminum chlorosilicate: In a 250 ml beaker, 160 grams of the PACSi of Example 2 was blended with 40 grams of a 50% solution of aluminum chlorohydrate (ACH), This yielded a 15.7% $Al_2O_3$ polyaluminum chlorosilicate solution with a basicity of 82%, 0.38% $SiO_2$, and a Si:Al ratio of 0.02.

Example 5

Production of Polyaluminum Chlorosilicate (PACSi) with SAS

Polyaluminum chlorosilicate: In a 250 ml beaker 140 grams of the PACSi of Example 2 was blended with 60 grams of ACH. This yielded a 16.7% $Al_2O_3$ polyaluminum chlorosilicate solution with a basicity of 82%, 0.38% $SiO_2$, and a Si:Al ratio of 0.019.

Example 6

Water Jar Testing to Compare Performance of PACS and PACSi

Jar testing was performed on water obtained from the Occoquan Reservoir to compare the performance of Sulfated PACS versus PACSi. Table 1 below demonstrates improved removal of turbidity and NPOCs by PACSi described herein versus PACS. At same alumina dosage, PACSi (Jars 3-6) showed double the percentage of turbidity removal and of NPOC removal as compared with PACS (Jars 1 and 2). The PACSi samples removed more turbidity and nonpurgeable organic carbon (NPOC) than DP-2500, a commercially available sulfated PACS, available from USALCO, Baltimore, Md.

TABLE 1

Performance of PACS versus PACSi

|  | Jar #1 | Jar #2 | Jar #3 | Jar #4 | Jar #5 | Jar #6 |
| --- | --- | --- | --- | --- | --- | --- |
| Product | DP-2500 PACS | DP-2500 PACS | Example 2 PACSi | Example 2 PACSi | Example 3 PACSi | Example 3 PACSi |
| Dosage microliters | 47 | 94 | 42 | 83 | 42 | 83 |
| Dosage mg/L | 30 | 60 | 27 | 54 | 27 | 54 |
| Dosage mg/L $Al_2O_3$ | 3.75 | 7.5 | 3.78 | 7.56 | 3.78 | 7.56 |
| Turbidity NTU | 0.925 | 0.675 | 0.724 | 0.514 | 0.743 | 0.43 |
| % Turbidity Removal | 16% | 39% | 34% | 53% | 32% | 61% |
| NPOC mg/L | 3.319 | 3.148 | 2.97 | 2.456 | 2.7 | 2.444 |
| % NPOC Removal | 13.5% | 18.0% | 22.6% | 36.0% | 29.7% | 36.3% |

Example 7

Water Jar Testing to Compare Performance of PACS and PACSi

Samples of stored and heat-stressed sulfated polyaluminum chlorides (PACS) were compared to PACSi products described herein with respect to each product's stability and efficacy under conditions of long term storage and heat exposure. Stable turbidity of polyaluminum chloride products is defined by the AWA having a turbidity value of less than 50 ntu. As shown in Table 2 below, the product turbidity of the tested PACs varied with temperature and storage time, showing unacceptable turbidity for PACs at 4 months and 6 weeks of storage, and at 110° F. In contrast, turbidity of the novel PACSi disclosed herein, remained stable and acceptable, despite long storage and exposure to heat, and were as effective in removing turbidity and NPOC from water. PACs stored for 6 weeks and exposed to high temperatures had the highest PAC turbidity of all samples, and actually increased the turbidity of the treated water rather than removing turbidity (Jar 3).

TABLE 2

Degradation by Heat and Storage of PACs versus PACSi

|  | Jar #1 | Jar #2 | Jar #3 | Jar #4 | Jar #5 | Jar #6 |
|---|---|---|---|---|---|---|
| Product | DP-2500 Fresh | DP 2500 4 months | DP 2500 6 weeks at 110 F. | Example 4 2.5 months | Example 4 10 weeks at 110 F. | Example 5 10 months |
| Product Turbidity NTU | 2.7 | 90 | 408 | 5.8 | 16.1 | 3.9 |
| Dosage microliters | 22.5 | 22.5 | 22.5 | 17 | 17 | 16.5 |
| Dosage mg/L | 29 | 29 | 29 | 22 | 22 | 22 |
| Dosage mg/L $Al_2O_3$ | 3.55 | 3.55 | 3.55 | 3.55 | 3.55 | 3.55 |
| Turbidity NTU | 1.86 | 1.97 | 7.88 | 1.27 | 1.37 | 1.1 |
| % Turbidity Removal | 73% | 72% | −13% | 82% | 80% | 84% |

Example 8

Jar Testing of Antigua Water to Compare ACL and PACSi

Jar testing was performed on water obtained from Antigua to compare the performance of Aluminum Chlorohydrate versus PACSi. The water is naturally high in turbidity and organics. The chart below demonstrates the differences in performance: The settled turbidity was much higher in treatments with ACH than in treatments with PACSi at equal alumina dosages. The % NPOC removal was slightly better in the PACSi samples than the ACH, also at equal alumina dosages.

TABLE 3

Degradation by Heat and Age of PACs versus PACSi

|  | Jar #1 | Jar #2 | Jar #3 | Jar #4 | Jar #5 | Jar #6 |
|---|---|---|---|---|---|---|
| Product | ACH | ACH | ACH | Example 5 | Example 5 | Example 5 |
| Dosage microliters | 15.25 | 16 | 17 | 22.5 | 23.5 | 25 |
| Dosage mg/L | 20.3 | 22.6 | 24.6 | 29.2 | 32.5 | 35.1 |
| Dosage mg/L $Al_2O_3$ | 4.8 | 5.3 | 5.8 | 4.7 | 5.2 | 5.7 |
| Turbidity NTU | 5.37 | 2.72 | 2.07 | 1.76 | 1.65 | 1.63 |
| % Turbidity Removal | 94.6% | 97.3% | 97.9% | 98.2% | 98.3% | 98.4% |
| NPOC mg/L | 6.4 | 6.25 | 6.29 | 6.39 | 6.20 | 6.20 |
| % NPOC Removal | 28.7% | 30.4% | 30.0% | 28.8% | 31.0% | 31.0% |

Example 9

The following chart demonstrates the freezing issue of aluminum chlorohydrate. The PACSi compositions produced in Examples 2-5 do not freeze at temperatures of 0° F. or higher. In contrast the polyaluminum chlorosulfate PACS, DelPAC2020, as well as ACH showed signs of freezing, whereas the more concentrated PACS Del-PAC2500 did not freeze at 0° F. DelPAC 2020 and 2500 are commercially available sulfate polyaluminum chlorides.

TABLE 4

Freezing Point of PACs versus PACSi

| Product | Freezing Point |
|---|---|
| Example 2 | <0° F. |
| Example 3 | <0° F. |
| Example 4 | <0° F. |
| Example 5 | <0° F. |
| ACH | 22° F. |
| DelPAC 2500 | <0° F. |
| DelPAC 2020 | Partial at 0° F. |

What is claimed is:

1. A method for producing a sodium aluminum silicate (SAS) composition, the method comprising the steps of:
   a) preparing a mixture containing: 30-60 wt % of a 50% NaOH, 1.7-6 wt% of a 30% sodium silicate solution, and 5-15 wt % water;
   b) heating the mixture until the mixture is clear;
   c) after the mixture is clear, adding 35-50 wt % aluminum oxide trihydrate to the mixture to form a liquid solution; and
   d) heating the liquid solution until the aluminum oxide trihydrate is dissolved in order to produce the SAS composition having a molar ratio of Si:Al of 0.015-0.08 and a molar ratio of $Na_2O:Al_2O_3$ of 1.0-1.30.

2. The method of claim 1, wherein the mixture is heated to a boiling temperature of the mixture.

3. The method of claim 1, wherein the mixture is heated when adding the aluminum oxide trihydrate.

4. The method of claim 1, wherein the solution is heated for 1 hour.

5. The method of claim 1, wherein the aluminum oxide trihydrate is added to the mixture such that a resulting aluminum oxide concentration is 20% to 27% $Al_2O_3$.

6. The method of claim 1, wherein the sodium silicate solution includes 0.9 to 4 wt % $SiO_2$.

7. A SAS composition produced by the method of claim 1 having a formula:

$$(Na_2O)a(Al_2O_3)(SiO_2)_c \quad \text{(Formula III)},$$

wherein:
a is 1-1.3 and c is 0.03 -0.15
and Si:Al has a molar ratio of 0.015-0.08 and $Na_2O:Al_2O_3$ has a molar ratio 1.8-1.30.

8. The SAS composition of claim 7, comprising:
a) 20-32 wt % $Al_2O_3$;
b) 12-22 wt % $Na_2O$; and
c) 0.5-1.7 wt % $SiO_2$.

9. The SAS composition of claim 7, wherein $Na_2O:Al_2O_3$ has a molar ratio of 1.22-1.30.

10. A method of treating water to remove impurities, the method comprising:
   producing the SAS composition according to claim 1; and
   adding the SAS composition to water in order to remove turbidity and/or non-purgeable organic carbon (NPOC) from the water.

11. A method of treating water to remove impurities, the method comprising:
   producing the SAS composition according to claim 1;
   mixing a solution of 10 to 30 wt % of the SAS composition with a solution of 70 to 90 wt % comprising basic aluminum chloride (BAC) or aluminum chloride (ACL) to form a second solution; and
   adding the second solution to water in order to remove turbidity and/or NPOC from the water.

12. The method of treating water according to claim 11, wherein the mixing includes agitating the second solution for 1 hour to 12 hours.

13. The method of treating water according to claim 11, further comprising
   forming a silicated BAC or a silicated ACL before the mixing, wherein the second solution comprises the solution of 10 to 30 wt % of the SAS composition and the solution of 70 to 90 wt % of the silicated BAC or the silicated ACL.

\* \* \* \* \*